E. G. SPIETH.
MOUSE AND RAT TRAP.
APPLICATION FILED NOV. 8, 1921.
1,428,918. Patented Sept. 12, 1922.
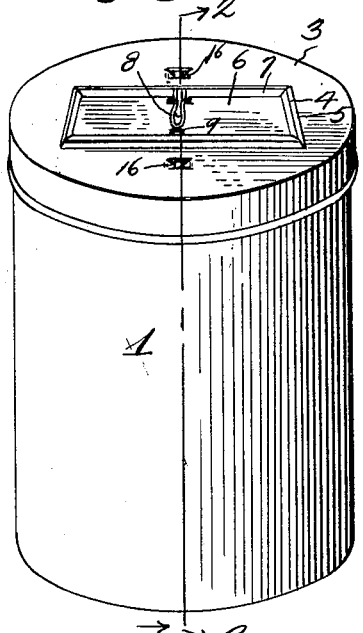
Fig. 1.
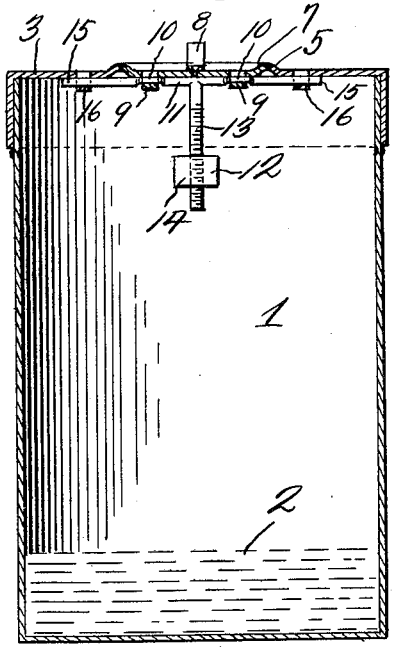
Fig. 2.
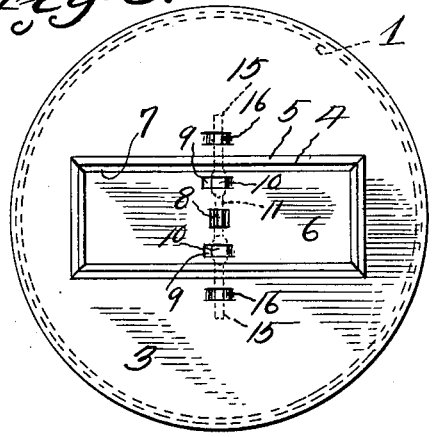
Fig. 3.
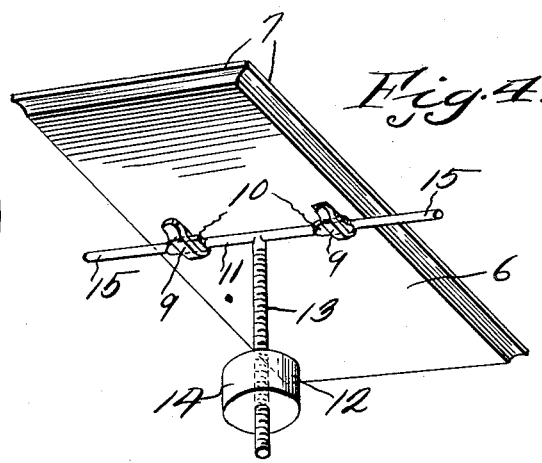
Fig. 4.
Fig. 5.
E. G. Spieth, Inventor
By Philip A. Jerrell, his Attorney Patented Sept. 12, 1922.

1,428,918

UNITED STATES PATENT OFFICE.

EDWARD G. SPIETH, OF AMHERST, NEBRASKA.

MOUSE AND RAT TRAP.

Application filed November 8, 1921. Serial No. 513,629.

*To all whom it may concern:*

Be it known that EDWARD G. SPIETH, a citizen of the United States, residing at Amherst, in the county of Buffalo and State of Nebraska, has invented certain new and useful Improvements in Mouse and Rat Traps, of which the following is a specification, reference being had therein to the accompanying drawings.

The invention relates to rat traps, and has for its object to provide a device of this character comprising a receptacle in which water may be placed and a removable cover for said receptacle, said cover being provided with a tiltable centrally pivoted and counterweighted member which tilts under the weight of an animal, thereby allowing the animal to drop into the water within the receptacle and the tiltable member returned to normal horizontal position under the influence of a weight.

A further object is to provide means whereby the weight may be adjusted closer to the pivotal point of the tiltable member, or away from the pivotable point, thereby varying the weight necessary to tilt the tiltable member.

A further object is to provide a T-shaped member having its horizontal arm secured to the under side of the tiltable member by means of struck out tongues engaging over flattened portions thereof, the ends of said horizontal arm being pivotally mounted in bearings formed by struck down portions adjacent the opening in the receptacle cover.

A further object is to provide a centrally disposed bait holding member carried by the tiltable member. Also to provide the marginal edge of the opening in the can cover and the marginal edge of the tiltable member with upwardly extending stiffening flanges thereby allowing the device to be formed from spring material.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the trap.

Figure 2 is a vertical sectional view through the trap taken on line 2—2 of Figure 1.

Figure 3 is a top plan view of the trap.

Figure 4 is a bottom perspective view of the tiltable platform.

Figure 5 is a vertical transverse sectional view through the upper end of the trap, showing a modified form of tiltable platform and tripping means therefor.

Referring to the drawings, the numeral 1 designates the body of the trap into which water 2 is placed, into which water the animal drops and is drowned. The body 1 of the trap is provided with a removable cover 3 which is preferably flanged as shown and which may be removed for cleaning out the body of the trap. The cover 3 is provided with a centrally disposed elongated rectangular shaped opening 4, which is formed by stamping out the central portion thereof and during the operation forming an upwardly extending reinforcing flange 5, thereby providing means for reinforcing the edge of the opening 4 and at the same time allowing the cover to be formed from a light material. Disposed within the opening 4 is a tiltable platform 6, which platform is formed from the piece of material stamped from the cover 3 when the opening 4 is formed, said tiltable platform 6 also being provided with a marginal upstanding reinforcing rib 7, which rib reinforces the tiltable platform and at the same time forms means whereby meal or other material which may be deposited on the platform will be prevented from sliding off the platform during a tilting operation. The tiltable platform 6 at a point substantially centrally thereof is provided with a bait clamp 8, in which bait may be held for attracting the animal onto the tiltable platform 6 where its weight will tilt the platform and the animal will drop through the opening 4 into the water 2.

Secured to the under side of the tiltable platform 6 by means of struck out tongues 9 which pass over flattened portions 10 of a horizontally disposed rod 11 is a counterweighting device 12, which device comprises a vertically disposed threaded rod 13 on which is threaded a weight 14. The ends 15 of the horizontally disposed rod 11 are mounted in bearings on the cover 3, which bearings are formed by downwardly struck integral loops 16 which may be formed at the same time the opening 4 is formed in the cover 3. It will be seen that by adjusting the weight 14 upwardly or downwardly the amount of weight necessary to tilt the tiltable platform 6 may be varied and that by providing the tongues 9 and flattened portions 10, that the rod 11 will be prevented from rotation during the tilting operation and consequently the threaded arm 13 and its weight will be moved outwardly until the animal drops through the opening 4, at which time the weight 14 will return the tiltable platform to normal horizontal position.

It will be seen that the opening 4, the stiffening rib 5 and the struck down portions 16 may be formed by a single operation of a die, and if so desired the tiltable platform and the tongues 9 formed in the same operation, however it is to be understood that the same may be formed in as many operations as desired.

Referring to Figure 5 the tiltable platform 6 is adapted to move downwardly in the direction of the arrow a and upwardly in the direction of the arrow b at the other end during a rat trapping operation. In this form a bait hook 17 is provided, which hook is pivoted at 18 and provided with a downwardly extending arm 19 which extends through a slot 20 in the cover 3 and is provided with fingers 21 between which the free edge of the platform 6 is received and normally held by means of a leaf spring 22. When an animal passes onto the tiltable platform 6 and grasps the bait carried by the bait hook 17, the arm 19 moves outwardly thereby releasing the free edge of the tiltable platform 6 and allowing the same to move upwardly under the influence of the weight of the animal. After the releasing operation the arm 19 is again sprung inwardly by the leaf spring 22, and after the animal has passed through the cover opening 4 into the body 1 of the receptacle the platform is again returned to normal horizontal position by means of the weight 23 and the free end of the tiltable platform engages the inclined surface 24 of the arm 19, forces said arm outwardly against the action of the spring 22 and again assumes a position between the fingers 21.

From the above it will be seen that an animal trap is provided which is simple in construction and particularly adapted for use as a mouse trap, however it is to be understood that the trap may be used for any kind of an animal. It will also be seen that a trap is provided wherein a multiplicity of mice may be captured and drowned with the same bait and in such a manner they will not frighten away other mice.

The invention having been set forth what is claimed as new and useful is:—

1. An animal trap comprising a receptacle having a removable cover, a tiltable platform horizontally disposed in an opening of the cover, a T-shaped member disposed beneath said platform, the horizontal portion of said T-shaped member being provided with flattening portions, integral tongues struck out from the platform and engaging over the flattened portions of the horizontal portion of the T-shaped member, the ends of the horizontal portions of the T-shaped member extending beyond the sides of the opening in the cover and having bearings in struck down loops carried by the cover and an adjustable counterweight threaded on the vertical portion of the T-shaped member.

2. The combination with a tiltable platform of a trap, said tiltable platform being mounted in an opening of a receptacle, of a T-shaped member having its horizontal portion secured to the under side of the platform, the ends of the horizontal portion of the T-shaped member having bearings adjacent the sides of the platform, and a counterweight carried by the vertical portion of the T-shaped member.

In testimony whereof I hereunto affix my signature.

EDWARD G. SPIETH.